United States Patent
Xu et al.

(10) Patent No.: US 12,403,636 B2
(45) Date of Patent: Sep. 2, 2025

(54) SUPERCRITICAL IN-MOLD FOAM FORMING DEVICE WITH PRETREATMENT FUNCTION AND FOAMING METHOD THEREOF

(71) Applicant: Dongguan Hailex New Material Science and Technology Co., Ltd, Dongguan (CN)

(72) Inventors: Xiaojun Xu, Dongguan (CN); Zhenhuan Luo, Dongguan (CN); Fuqi Liu, Dongguan (CN); Zhaoyang Zhou, Dongguan (CN); Runhong Liu, Dongguan (CN)

( * ) Notice: Subject to any disclaimer, the term of this patent is extended or adjusted under 35 U.S.C. 154(b) by 89 days.

(21) Appl. No.: 18/324,933

(22) Filed: May 26, 2023

(65) Prior Publication Data

US 2024/0391144 A1    Nov. 28, 2024

(51) Int. Cl.
*B29C 44/34* (2006.01)
*B29C 44/02* (2006.01)
*B29C 44/60* (2006.01)
*B29K 105/04* (2006.01)

(52) U.S. Cl.
CPC .......... *B29C 44/3403* (2013.01); *B29C 44/02* (2013.01); *B29C 44/60* (2013.01); *B29K 2105/04* (2013.01)

(58) Field of Classification Search
CPC .............................. B29C 44/3403; B29C 44/02
See application file for complete search history.

(56) References Cited

FOREIGN PATENT DOCUMENTS

| | | | | |
|---|---|---|---|---|
| CN | 1225308 A | 8/1999 | | |
| CN | 103042647 A | 4/2013 | | |
| CN | 104893110 A | 9/2015 | | |
| CN | 104097288 B | * 10/2016 | | |
| CN | 108501288 A | 9/2018 | | |
| CN | 209718438 U | 12/2019 | | |
| CN | 111098437 A | * 5/2020 | ......... | B29C 44/3403 |
| CN | 111283946 A | * 6/2020 | ......... | B29C 44/3403 |
| CN | 112976458 A | 6/2021 | | |
| CN | 115008672 A | 9/2022 | | |
| CN | 115093644 A | 9/2022 | | |
| CN | 218222317 U | 1/2023 | | |
| CN | 115847701 A | 3/2023 | | |
| CN | 116572458 A | * 8/2023 | ......... | B29C 44/3403 |
| DE | 102013225132 A | 6/2015 | | |
| DE | 202017107149 U | 4/2018 | | |
| JP | 2009051870 A | 3/2009 | | |

(Continued)

*Primary Examiner* — Atul P. Khare
(74) *Attorney, Agent, or Firm* — Novoclaims Patent Services LLC; Mei Lin Wong (57) ABSTRACT

Disclosed are a supercritical in-mold foam forming device with a pretreatment function and a foaming method thereof. The supercritical in-mold foam forming device comprises a high-pressure reactor. A safety valve is disposed at the top of the high-pressure reactor and seals the top of the high-pressure reactor. A driving member used for driving is mounted in the middle of the top of the high-pressure reactor through bolts. An intra-mold temperature control module is disposed in a foaming mold, two groups of uniform heating plates are controlled be powered on synchronously to generate heat, and a temperature gradient is formed in a graphite backing plate by controlling the difference in proportion of output power.

10 Claims, 8 Drawing Sheets

(56) References Cited

FOREIGN PATENT DOCUMENTS

| | | | |
|----|----|----|----|
| JP | 2022167025 | A | 11/2022 |
| KR | 20200075722 | A | 6/2020 |
| KR | 20200145950 | A | 12/2020 |

* cited by examiner

SUPERCRITICAL IN-MOLD FOAM FORMING DEVICE WITH PRETREATMENT FUNCTION AND FOAMING METHOD THEREOF

BACKGROUND OF THE PRESENT INVENTION

The invention relates to supercritical foaming-related fields, in particular to a supercritical in-mold foam forming device with a pretreatment function and a foaming method thereof.

DESCRIPTION OF RELATED ARTS

During the foam forming or polymer material foaming process, a physical foaming agent or chemical foaming agent is added for reaction to form a cellular structure or a porous structure. The foam forming process comprises the basic steps of bubble nucleation, bubble growth or expansion, and bubble stabilization; and under given temperature and pressure conditions, gas reaches a saturated state with the decrease of its solubility, and redundant gas is discharged and bubbles are formed to realize nucleation.

An existing compression molding method for preparing microcellular foamed plastic cannot sufficiently mix supercritical gas and polymer and cannot realize uniform distribution of cells of a prepared material, thus limiting further improvement of the performance of the material.

In addition, most existing pretreatment methods perform pretreatment merely by stirring and mixing, which lead to low mixing efficiency and makes it difficult to quickly infiltrate a foaming agent into foam particles, so the foam material has to stand in the foaming agent for an excessively long time, compromising the foaming efficiency.

SUMMARY OF THE PRESENT INVENTION

To overcome the abovementioned defects, the invention provides a supercritical in-mold foam forming device with a pretreatment function and a foaming method thereof.

The invention is implemented as follows: a supercritical in-mold foam forming device with a pretreatment function and a foaming method thereof are provided. The supercritical in-mold foam forming device comprises a high-pressure reactor, a safety valve is disposed at the top of the high-pressure reactor and seals the top of the high-pressure reactor, a driving member used for driving is mounted in the middle of the top of the high-pressure reactor through bolts, a foaming mold is mounted on a support frame at the bottom of the high-pressure reactor through bolts, and a control panel is mounted in the middle of a right end of high-pressure reactor through bolts;

Wherein, the supercritical in-mold foam forming device further comprises a pretreatment module disposed at a front end of the high-pressure reactor;

The pretreatment module comprises: a heating box used for heating an inert gas to control the temperature of the inert gas and mounted at a front end of the high-pressure reactor through bolts; a one-way metering valve fixedly mounted at a pipe opening connected to a left end of the heating box; a programmable control box mounted at the top of the heating box through bolts, a heat-insulation cushion being disposed between the heating box and the programmable control box; an intra-mold temperature control module disposed in the foaming mold and connected to the programmable control box through a cable; a temperature control valve mounted at a through hole in the bottom of a right end of the heating box through a pipe; a radial gas cutting module disposed in the high-pressure reactor; and an axial stirring module disposed at the bottom of the driving member; wherein, the driving member is specifically composed of a gearbox and a motor, and the one-way metering valve and the temperature control valve are connected to interfaces of the programmable control box through cables.

Preferably, the intra-mold temperature control module comprises: matching mold bodies fixedly mounted on opposite upper and lower sides of the foaming mold and in seal fit the upper and lower sides of the foaming mold; uniform heating plates mounted on inner sides of the matching mold bodies on the upper and lower sides of the foaming mold through bolts; an intermediate mold body, the matching mold bodies being in seal fit with upper and lower side of the intermediate mold body; a graphite backing plate used for heat conduction and disposed on an inner wall of the intermediate mold body; a high-sensitivity temperature gauge disposed in the intermediate mold body; a data switching unit connected to and mounted at the bottom of the high-sensitivity temperature gauge through a cable; and a horizontal connecting plate inserted and fixed in a front side of the intermediate mold body.

Preferably, a heat-conducting material layer is filled and fixed in the inner wall of the intermediate mold body, and the high-sensitivity temperature gauge is fixed in an internal space of the heat-conducting material layer.

Preferably, the radial gas cutting module comprises: a diverter valve, a right end of the temperature control valve being connected to a gas port in the bottom of the diverter valve through a pipe; a retainer ring rotatably disposed at the top of the diverter valve; rigid tubes used for flow guiding and inserted and fixed in through holes in an outer circular side of the diverter valve; a hollow ring, the rigid tubes being connected to through holes in an inner circular wall of the hollow ring through pipes; a ceramic plate, the hollow ring being connected to upper and lower sides of the ceramic plate through bolts respectively; a sprayer disposed on an inner circular wall of the ceramic plate; and heat-resistant ring tubes, through holes in the upper and lower sides of the ceramic plate being connected to a gas outlet of the hollow ring through heat-resistant ring tubes respectively.

Preferably, a central point of the retainer ring and a center of the hollow ring are located at a same height, and six groups of rigid tubes are disposed on the outer side of the diverter valve, and outer sides of the rigid tubes are coated with heat-insulation coatings.

Preferably, the sprayer comprises: a spraying plate mounted on an inner wall of the ceramic plate through bolts; a through groove formed in the spraying plate; a conical assembly fixedly mounted in the through groove; a polymer heat-resistant membrane filled in a space between the conical assembly and the through groove; an elastic element disposed on a conical head of the conical assembly; and a sealing plug, an outer end of the elastic element being elastically connected to the sealing plug.

Preferably, a gas hole is formed in a position, communicated with the through groove, of the conical assembly, the through groove and the conical assembly are identical in shape and are distributed in a proportion of 1:1.2, strip-shaped gas holes and strip-shaped lugs matched with the strip-shaped gas holes are disposed on the sealing plug and a through hole in a rear end of the through groove, and the polymer heat-resistant membrane is specifically a waterproof and breathable membrane.

Preferably, the axial stirring module comprises: a driven shaft inserted and fixed in an inner side of the retainer ring; a planetary gear set, a top of the driven shaft being inserted and fixed in a center of a sun gear of the planetary gear set, the planetary gear set being specifically composed of the sun gear, a planetary gear and a gear ring, the planetary gear of the planetary gear set being inserted and fixed in a shaft of the gearbox of the driving member, and a gear ring plate of the planetary gear set being fixed to an inner wall of the hollow ring; axial blades inserted and fixed to upper and lower sides of an outer shaft of the driven shaft; a grinding block used for grinding and mounted on an outer side of a middle section of the driven shaft; a grinding ring disposed on an outer side of the grinding block; a lantern ring, the grinding ring being mounted on an inner wall of the lantern ring through bolts; and a heat-insulation cross rod, an outer side of the lantern ring being fixedly mounted on an inner circular surface of the spraying plate through the heat-insulation cross rod.

Preferably, opposite upper and lower sides of the grinding block and the grinding ring are arc-shaped, and a distance between the grinding block and the grinding ring is 1 cm.

Preferably, the foaming method of the supercritical in-mold foam forming device with a pretreatment function comprises:

Step 1: first, connecting, by a worker, an external pipe to the one-way metering valve, and guiding an inert gas into the heating box to be heated, wherein the inert gas is specifically carbon dioxide commonly used during a foaming process; then, guiding the heated inert gas into the radial gas cutting module through the temperature control valve to sweep and preheat an interior of the high-pressure reactor, then enabling the inert gas to flow back into the heating box through a pipe at the top of the high-pressure reactor, and opening the safety valve to add a foam material and a foaming agent into the high-pressure reactor;

Step 2: controlling, through the control panel, the driving member to drive the planetary gear set to drive the driven shaft and the hollow ring to rotate in opposite directions, at this moment, driving, by the axial blades, the foam material and the foaming agent to flow from bottom to top to enter the hollow ring, enabling the grinding block and the grinding ring to rotate in opposite directions to grind the foam material, and then, guiding the inert gas into the radial gas cutting module and spraying it out through the through hole in the inner side of the through groove, such that the foam material and the foaming agent are sheared and stirred in a radial direction by the radial gas cutting module, and are stirred and ground in an axial direction by the axial blades and the grinding block (474), making the foaming agent infiltrate into the foam material more quickly;

Step 3: controlling, by means of the programmable control box, the two groups of uniform heating plates to be powered on synchronously to generate heat, at this moment, controlling power output to the two groups of uniform heating plates to be different, wherein input power of the uniform heating plate at the top is maximum, and input power of the uniform heating plates below is decreased in proportion; a difference in output heat of the uniform heating plates leads to a temperature gradient in the graphite backing plate, the heat is reflected around the high-sensitivity temperature gauge in equal proportion through filler materials in the intermediate mold body, and the proportion of the input power of the uniform heating plates is calculated by adjusting a heat value gradient detected by the high-sensitivity temperature gauge according to a preset value in the programmable control box; and Step 4: discharging a foamed preform out of the foaming mold through a discharge unit which is a common device used during the foaming process such as an extruder, then enabling the foamed preform to enter the graphite backing plate, making a 3D foaming ratio of the 3D preform nonsynchronous under the influence of the temperature gradient, with a foaming ratio along a length and width in a horizontal direction being small and a foaming ratio in a vertical direction being large, and then performing compression molding, wherein to guarantee the nonsynchronous 3D foaming ratio, a thickness of an internal space of the graphite backing plate is kept at a value which ensures that the heat output efficiency of the uniform heating plates, the heat conductivity of the graphite backing plate and the foam material, and the thickness of the internal space of the graphite backing plate are in direct proportion.

The invention has the following advantages: the invention provides, through improvement, a supercritical in-mold foam forming device with a pretreatment function and a foaming method thereof, which compared with similar devices, are improved in the following aspects:

According to the supercritical in-mold foam forming device with a pretreatment function and the foaming method thereof provided by the invention, the pretreatment module is disposed at the front end of the high-pressure reactor, an inert gas is guided, through the one-way metering valve, into the heating box to be heated, then the heated inert gas is guided into the radial cutting module through the temperature control valve, the axial stirring module is driven by the driving member, and the foam material and the foaming agent are sheared and stirred in radial direction by the radial gas cutting module and are stirred and ground in the axial direction by the axial stirring module, such that the foaming agent can infiltrate into the foam material more quickly.

According to the supercritical in-mold foam forming device with a pretreatment function and the foaming method thereof provided by the invention, the intra-mold temperature control module is disposed in the foaming mold, the two groups of uniform heating plates are controlled to be powered on synchronously to generate heat, a temperature gradient is formed in the graphite backing plate by controlling the difference in proportion of output power, heat is reflected around the high-sensitivity temperature gauge in equal proportion through the filler materials in the intermediate mold body, the foamed preform is conveyed into the graphite backing plate, the 3D foaming ratio of the 3D preform is nonsynchronous under the influence of the temperature gradient, with the foaming ratio along the length and width in the horizontal direction being small and the foaming ratio in the vertical direction being large, and then compression molding is performed.

According to the supercritical in-mold foam forming device with a pretreatment function and the foaming method thereof provided by the invention, the radial gas cutting module is disposed in the high-pressure reactor, the gas flow from the temperature control valve enters the ceramic plate through the rigid tubes and the hollow ring by means of the diverter valve, and at this moment, the gas pressure in the ceramic plate is increased to push the sealing plug to squeeze the elastic element, such that the sealing plug horizontally moves in the through groove; at this moment, the gas flow enters the conical assembly through the gap and is guided into the high-pressure reactor through the polymer heat-resistant membrane, the sealing plug is pushed by the gas pressure to move, the through groove is communicated with the interior of the ceramic plate through the strip-shaped groove formed in the outer side of the sealing plug, the space between the through groove and the interior of the ceramic plate can be quickly sealed by means of the elastic potential energy of the elastic element when the gas pressure decreases, and the foaming agent is prevented from flowing into the through groove by means of the polymer heat-resistant membrane which is made of a water-proof and breathable material, so the hollow ring is prevented from being blocked, the situation where the proportion of materials is out of balance due to the loss of the foaming agent is avoided, the influence on foaming infiltration is reduced, and the interior of the high-pressure reactor is better swept and preheated.

According to the supercritical in-mold foam forming device with a pretreatment function and the foaming method thereof provided by the invention, the axial stirring module is disposed in the high-pressure reactor, the driving member drives the planetary gear set to drive the driven shaft and the hollow ring to rotate in opposite directions, and at this moment, the axial blades drive the foam material and the foaming agent to flow axially in a direction parallel to the driven shaft, such that the foam material and the foaming agent flow from bottom to top to enter the hollow ring; the grinding block and the grinding ring rotate in opposite directions to grind the foam material, and then an inert gas is guided into the radial gas cutting assembly to shear and stir the foam material and the foaming agent in the radial direction.

Reference signs: 1, high-pressure reactor; 2, safety valve; 3, driving member; 4, pretreatment module; 5, foaming mold; 6, control panel; 41, heating box; 42, one-way metering valve; 43, programmable control box; 44, intra-mold temperature control module; 45, temperature control valve; 46, radial gas cutting module; 47, axial stirring module; 441, matching mold bodies; 442, uniform heating plate; 443, intermediate mold body; 444, graphite backing plate; 445, high-sensitivity temperature gauge; 446, data switching unit; 447, horizontal connecting plate; 461, diverter valve; 462, retainer ring; 463, rigid tube; 464, hollow ring; 465, ceramic plate; 466, sprayer; 467, heat-resistant ring tube; 4661, spraying plate; 4662, through groove; 4663, conical assembly; 4664, polymer heat-resistant membrane; 4665, elastic element; 4666, sealing plug; 471, driven shaft; 472, planetary gear set; 473, axial blade; 474, grinding block; 475, grinding ring; 476, lantern ring; 477, heat-insulation cross rod.

DETAILED DESCRIPTION OF THE PREFERRED EMBODIMENT

The principle and features of the invention will be described below in conjunction with FIG. 1-FIG. 8. Examples provided below are used for explaining the invention rather than limiting the scope of the invention. The advantages and features of the invention will be clearer with reference to the following description and claims. It should be noted that the drawings are in a simplified form and are not in accurate scale and they are merely used to assist in explaining the purposes of the embodiments of the invention easily and clearly.

It should be pointed out that when one module is referred to as being "fixed" the other module, it may be directly fixed to the other module, or there may be another module between the two modules. When one module is referred to as being "connected" to the other module, it may be directly connected to the other module, or there may be another module between the two modules. When one module is referred to as being "disposed" on the other module, it may be directly disposed on the other module, or there may be another module between the two modules. Terms such as "vertical", "horizontal", "left" and "right" and similar expressions are merely for a purpose of description.

Unless otherwise defined, all technical and scientific terms used in this specification have meanings as commonly understood by those skilled in the art. Terms used in the specification of the invention are merely used to describe specific embodiments, and are not intended to limit the invention. The term "and/or" used in this specification refers to any one or all combinations of one or more relevant items listed.

Figure 1:
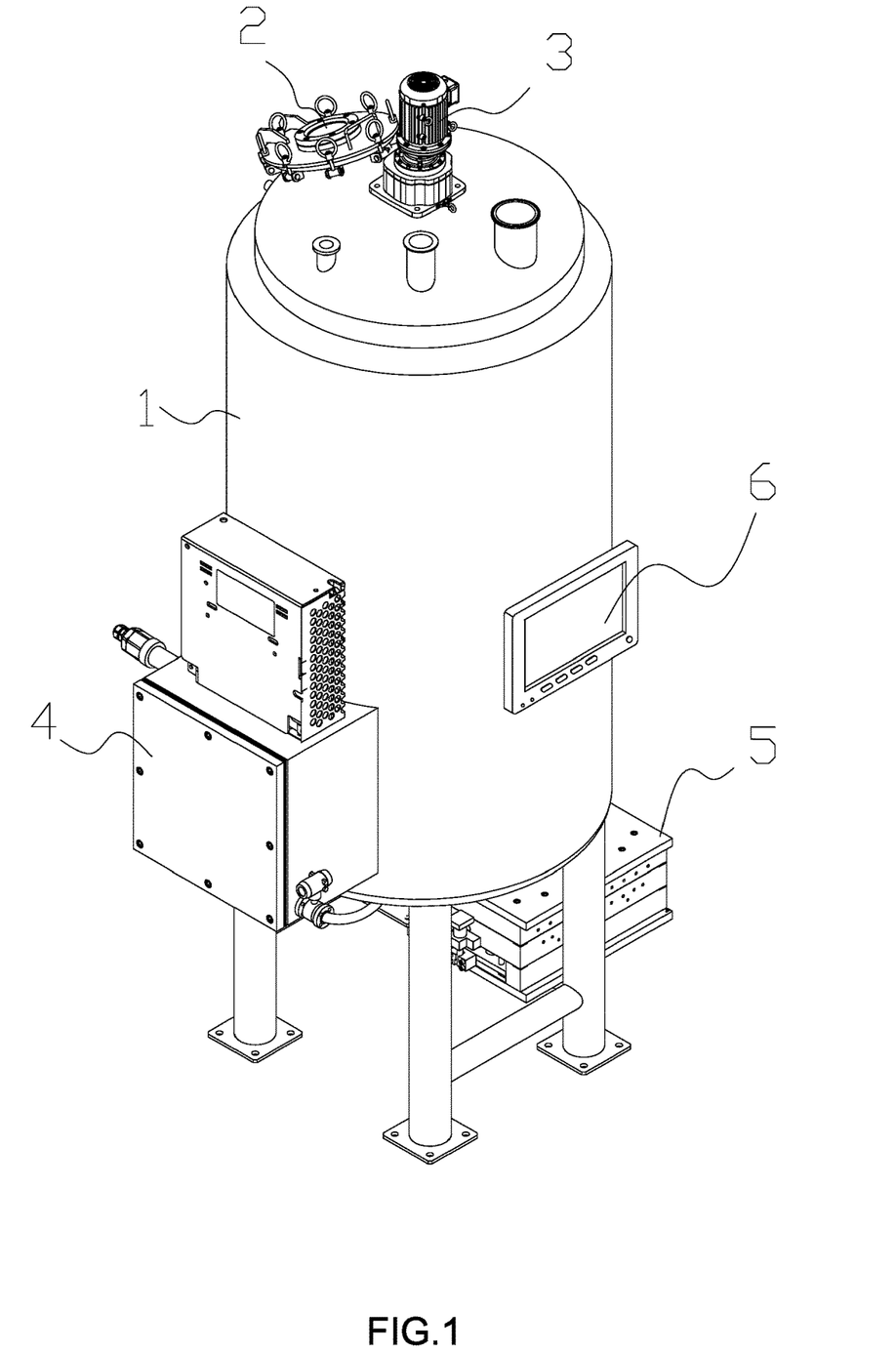
FIG. 1 is a structural view of the invention.
Figure 2:
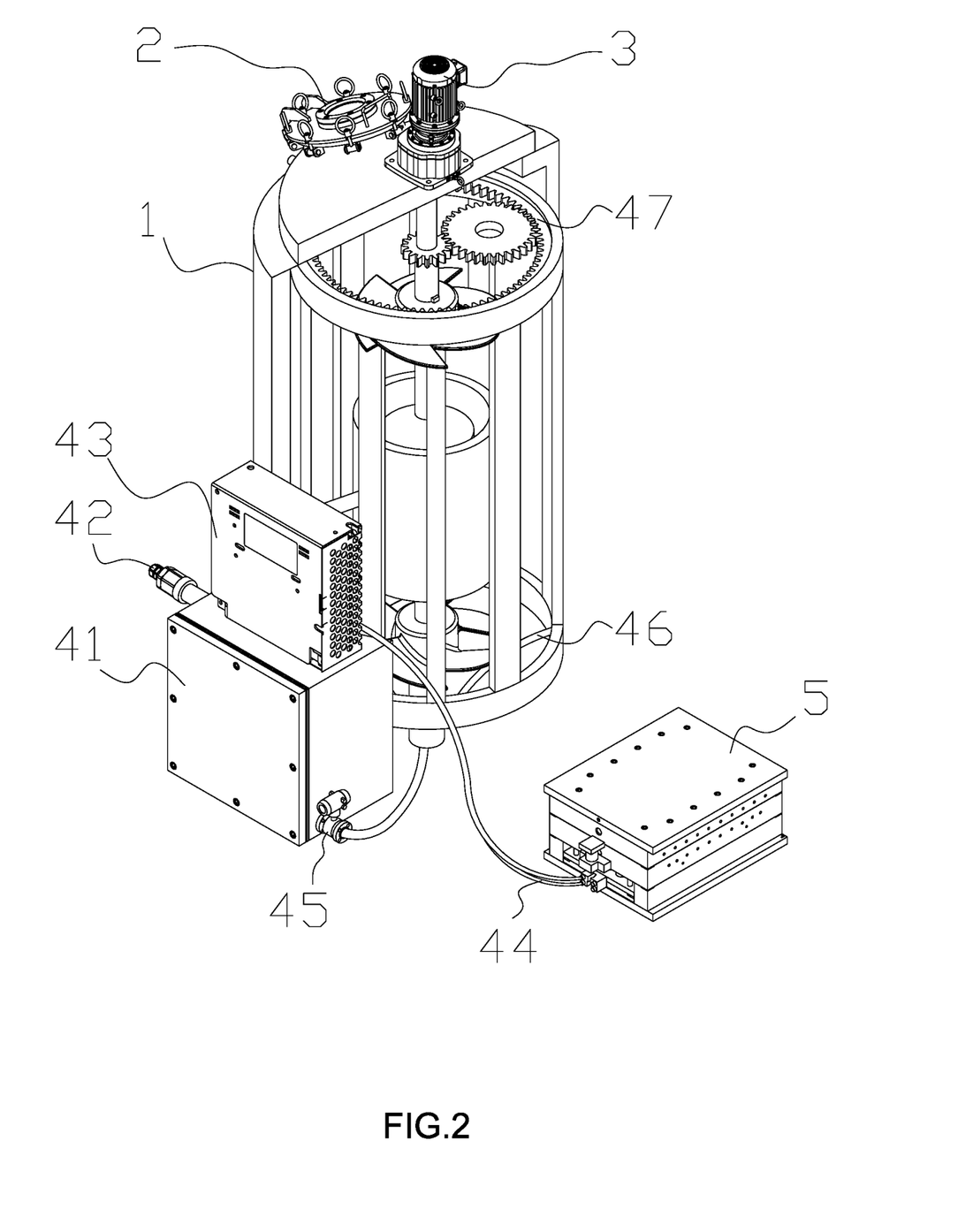
FIG. 2 is a three-dimensional sectional structural view of a high-pressure reactor and a pretreatment module of the invention.

Referring to FIG. 1-FIG. 8, the invention provides a supercritical in-mold foam forming device with a pretreatment function and a foaming method thereof. The supercritical in-mold foam forming device comprises a high-pressure reactor 1, wherein a safety valve 2 is disposed at the top of the high-pressure reactor 1 and seals the top of the high-pressure reactor 1, a driving member 3 used for driving is mounted in the middle of the top of the high-pressure reactor 1 through bolts, a foaming mold 5 is mounted on a support frame at the bottom of the high-pressure reactor 1 through bolts, and a control panel 6 is mounted in the middle of a right end of high-pressure reactor 1 through bolts;

Referring to FIG. 1-FIG. 2, according to the supercritical in-mold foam forming device with a pretreatment function and the foaming method thereof provided by the invention, the pretreatment module 4 comprises a heating box 41, the heating box 41 used for heating an inert gas to control the temperature of the inert gas is mounted at a front end of the high-pressure reactor 1 through bolts, a one-way metering valve 42 is fixedly mounted at a pipe opening connected to a left end of the heating box 41 and is used for metering the flow rate of the inert gas and guiding the inert gas, a programmable control box 43 is mounted at the top of the heating box 41 through bolts, a heat-insulation cushion is disposed between the heating box 41 and the programmable control box 43, the programmable control box 43 is connected to an intra-mold temperature control module 44 in the foaming mold 5 through a cable, all components of the intra-mold temperature control module 44 are controlled by means of a program input to the programmable control box 43, a temperature control valve 45 is mounted at a through hole in the bottom of a right end of the heating box 41 through a pipe, a radial gas cutting module 46 is disposed in the high-pressure reactor 1, an axial stirring module 47 is disposed at the bottom of the driving member 3, the driving member 3 is specifically composed of a gearbox and a motor, and the one-way metering valve 42 and the temperature control valve 45 are connected to interfaces of the programmable control box 43 through cables and are controlled by means of the programmable control box 43.

Figure 8:
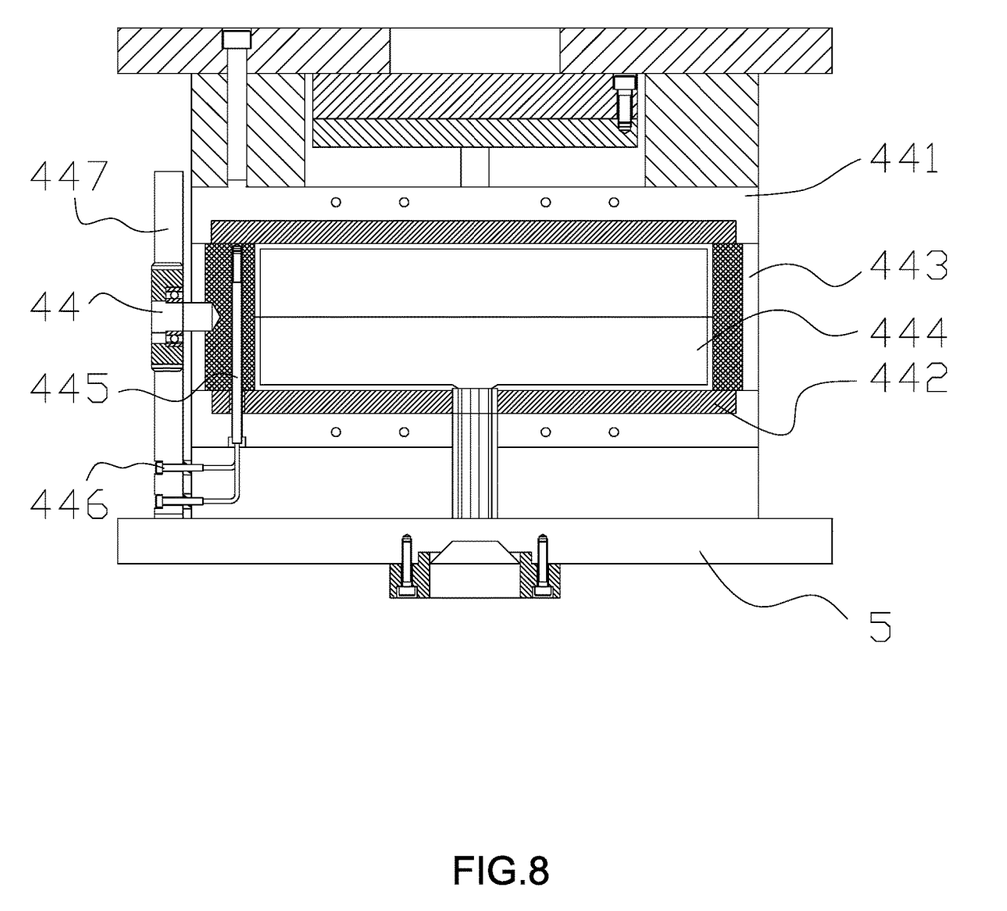
FIG. 8 is a right structural view of a foaming mold and an intra-mold temperature control module of the invention.

Referring to FIG. 8 and FIG. 2, according to the supercritical in-mold foam forming device with a pretreatment function and the foaming method thereof, the intra-mold temperature control module 44 comprises matching mold bodies 441, the matching mold bodies 441 are fixedly mounted on opposite upper and lower sides of the foaming mold 5 and are in seal fit the upper and lower sides of the foaming mold 5, uniform heating plates 442 are mounted on inner sides of the matching mold bodies 441 on the upper and lower sides of the foaming mold 5 through bolts, and are installed and limited by means of the matching mold bodies 441, the matching mold bodies 441 are in seal fit with upper and lower side of an intermediate mold body 443, a graphite backing plate 444 used for heat conduction is disposed on an inner wall of the intermediate mold body 443, heat in the intermediate mold body 443 can be conducted by means of the high heat conductivity of the graphite backing plate 444, a high-sensitivity temperature gauge 445 is disposed in the intermediate mold body 443, a data switching unit 446 is connected to and mounted at the bottom of the high-sensitivity temperature gauge 445 through a cable, a data switching effect is provided for the high-sensitivity temperature gauge 445 by means of the data switching unit 446, a horizontal connecting plate 447 is inserted and fixed in a front side of the intermediate mold body 443, a heat-conducting material layer is filled and fixed in the inner wall of the intermediate mold body 443, and the high-sensitivity temperature gauge 445 is fixed in an internal space of the heat-conducting material layer.

Figure 3:
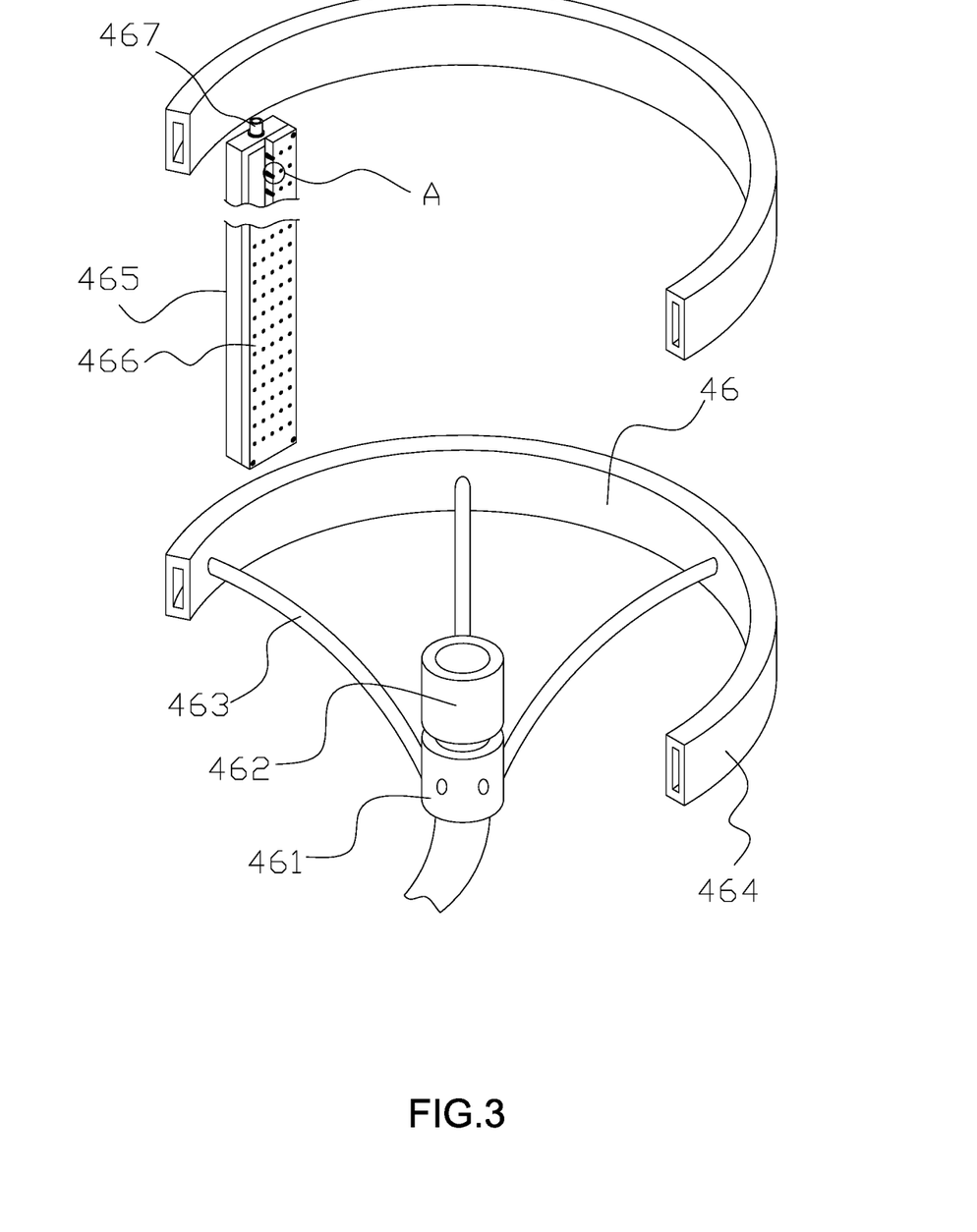
FIG. 3 is a three-dimensional structural view of a radial gas cutting module of the invention.

Referring to FIG. 3 and FIG. 2, according to the supercritical in-mold foam forming device with a pretreatment function and the foaming method thereof provided by the invention, the radial gas cutting module 46 comprises a diverter valve 461, a right end of the temperature control valve 45 is connected to a gas port in the bottom of the diverter valve 461 through a pipe, a retainer ring 462 is rotatably disposed at the top of the diverter valve 461, the diverter valve 461 is installed and limited by means of the retainer ring 462, rigid tubes 463 used for flow guiding are inserted and fixed in through holes in an outer circular side of the diverter valve 461 and are connected to through holes in an inner circular wall of a hollow ring 464 through pipes, the hollow ring 464 is connected to upper and lower sides of a ceramic plate 465 through bolts, a gas flow is guided into the ceramic plate 465 through the hollow ring 464, a sprayer 466 is disposed on an inner circular wall of the ceramic plate 465, through holes in the upper and lower sides of the ceramic plate 465 are connected to a gas outlet of the hollow ring 464 through heat-resistant ring tubes 467 respectively, the central point of the retainer ring 462 and the center of the hollow ring 464 are located at the same height, six groups of rigid tubes 463 are disposed on the outer side of the diverter valve 461, outer sides of the rigid tubes 463 are coated with heat-insulation coatings, and heat dissipation of the gas flow in the rigid tubes 463 is reduced by means of the heat insulating property of the rigid tubes 463.

Figure 4:
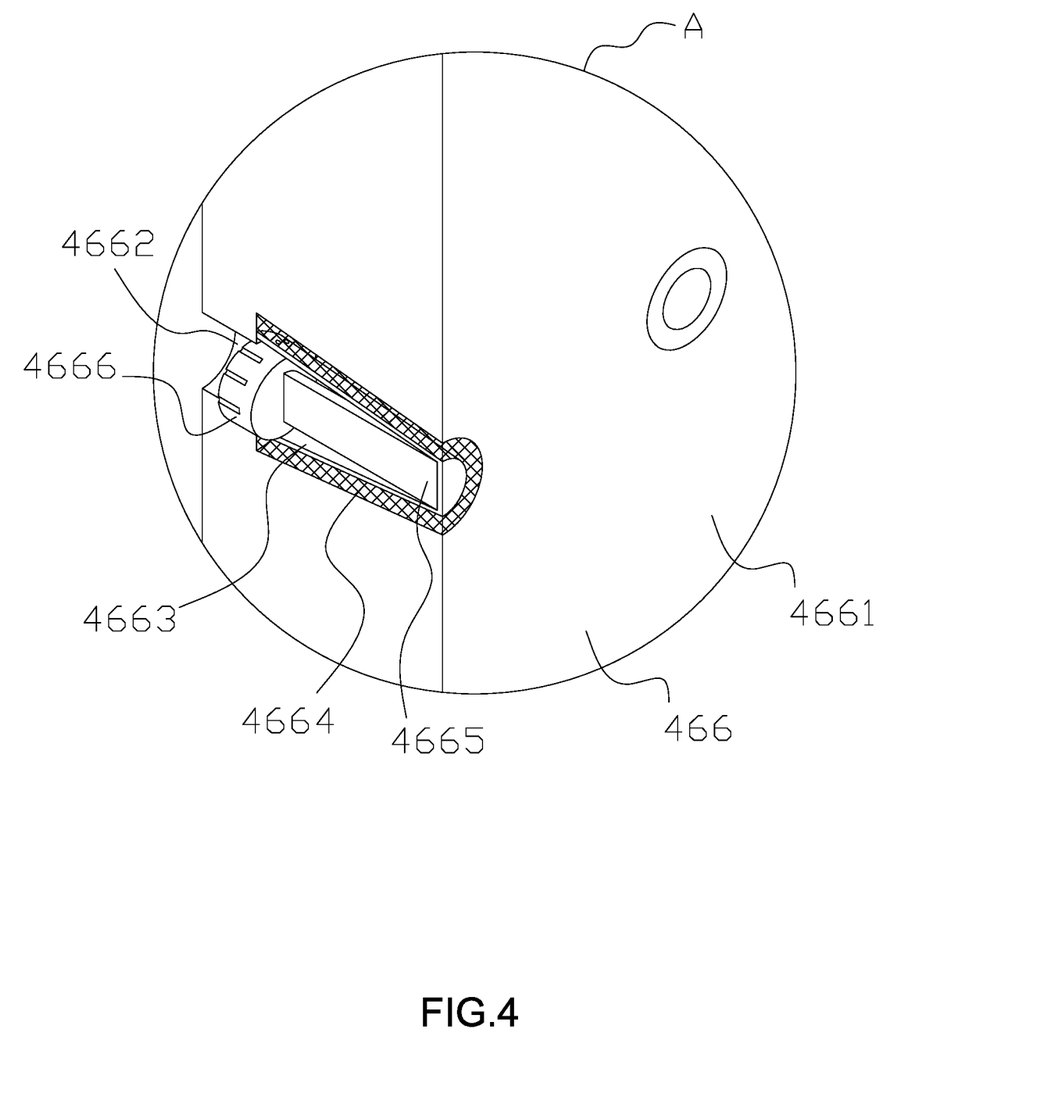
FIG. 4 is an enlarged structural view of part A in FIG. 2 of the invention.

Referring to FIG. 4, according to the supercritical in-mold foam forming device with a pretreatment function and the foaming method thereof provided by the invention, the sprayer 466 comprises a spraying plate 4661 mounted on an inner wall of the ceramic plate 465 through bolts, a through groove 4662 is formed in the spraying plate 4661, a conical assembly 4663 is fixedly mounted in the through groove 4662 and provides a flow resisting effect for the through groove 4662, the space between the conical assembly 4663 and the through groove 4662 is filled with a polymer heat-resistant membrane 4664 which makes the through groove 4662 water-roof, heat-proof and breathable, an elastic element 4665 is disposed on a conical head of the conical assembly 4663, an outer end of the elastic element 4665 is elastically connected to a sealing plug 4666, a gas hole is formed in a position, communicated with the through groove 4662, of the conical assembly 4663, the through groove 4662 and the conical assembly 4663 are identical in shape and are distributed in a proportion of 1:1.2, strip-shaped gas holes and strip-shaped lugs matched with the strip-shaped gas holes are disposed on the scaling plug 4666 and a through hole in a rear end of the through groove 4662, the gas flow is guided by means of the strip-shaped gas holes of the sealing plug 4666 and the through groove 4662, and the polymer heat-resistant membrane 4664 is specifically a water-proof and breathable membrane.

Figure 5:
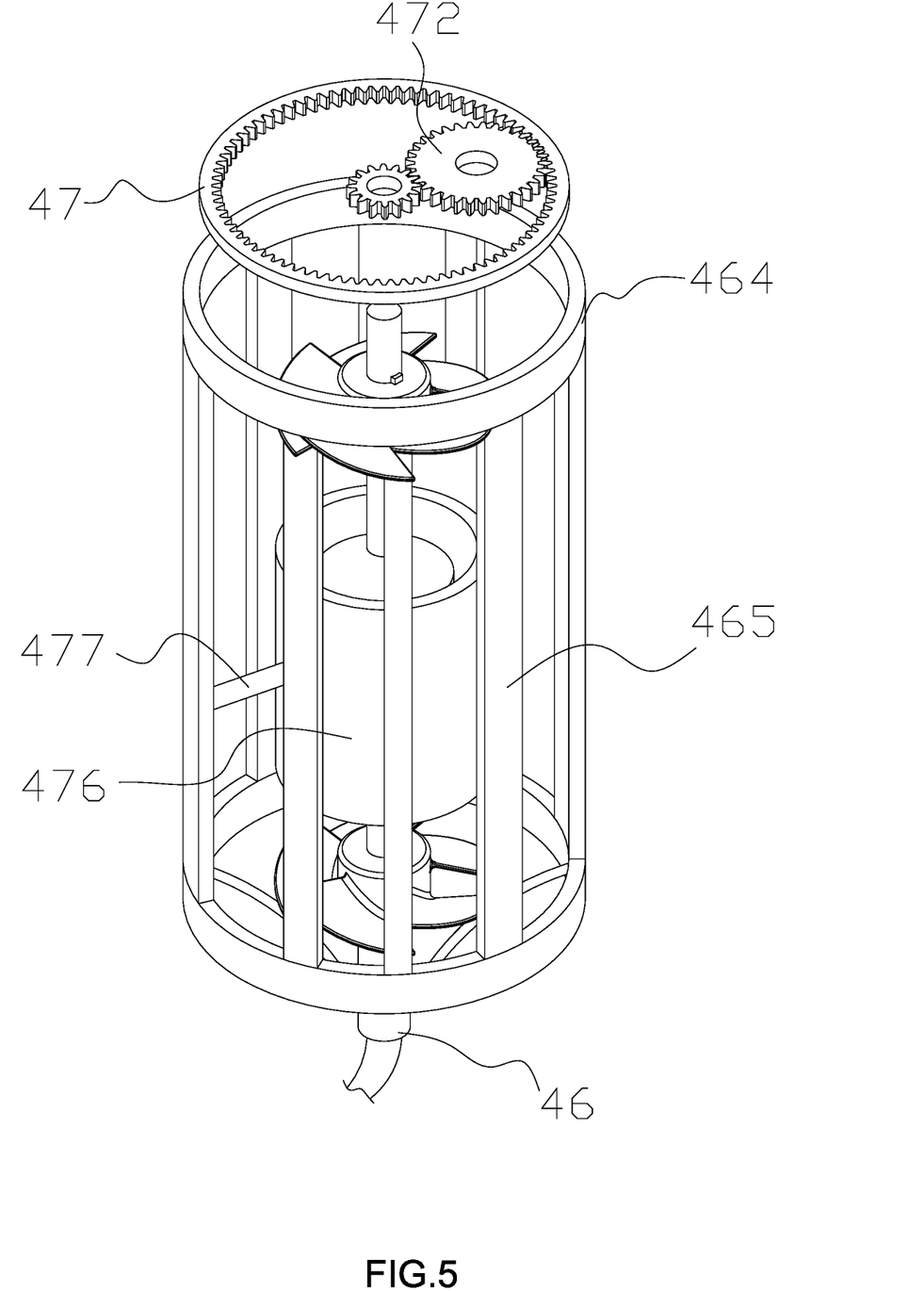
FIG. 5 is a three-dimensional structural view of the radial gas cutting module and an axial stirring module of the invention.
Figure 6:
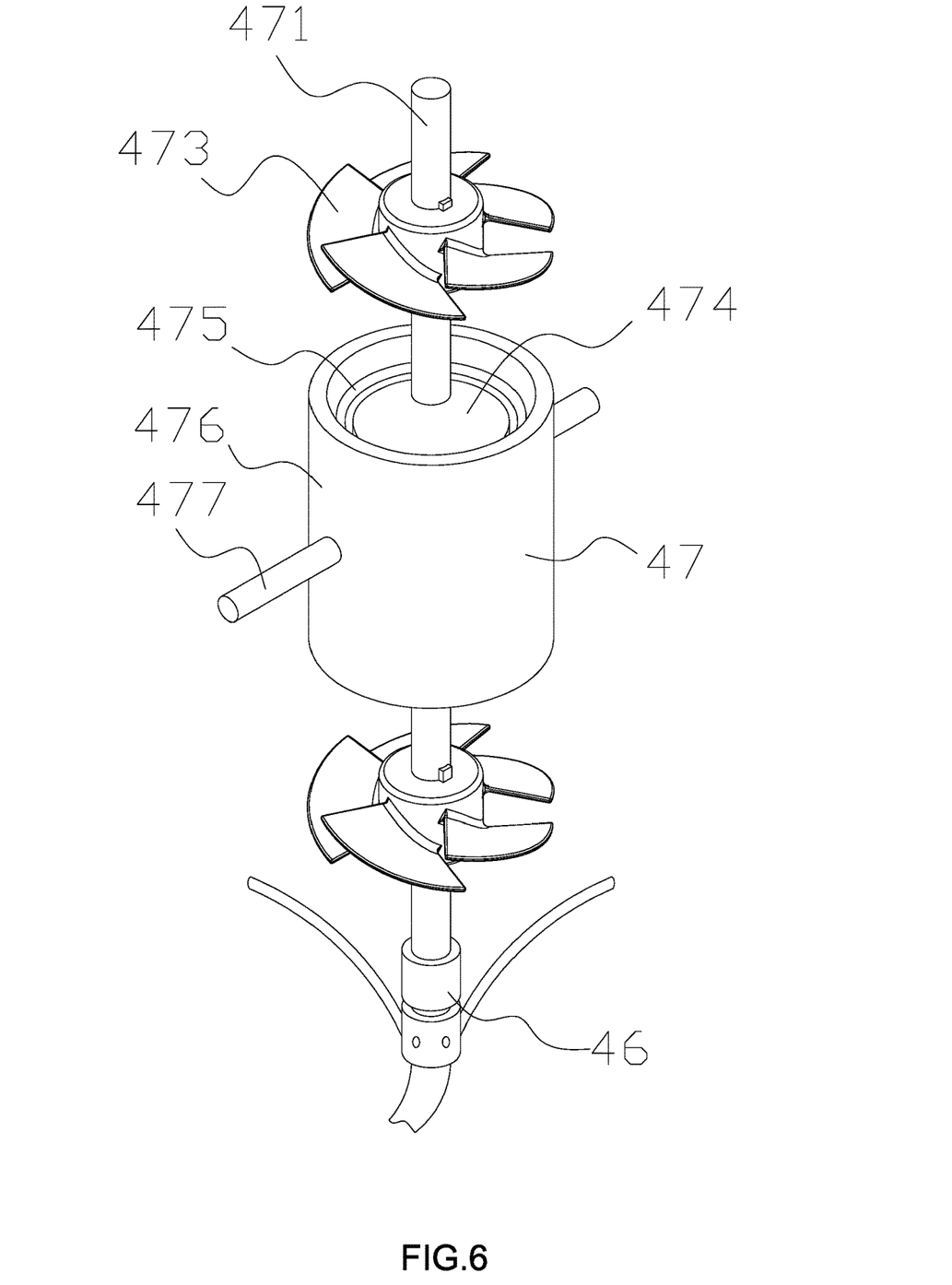
FIG. 6 is a three-dimensional structural view of the axial stirring module of the invention.
Figure 7:
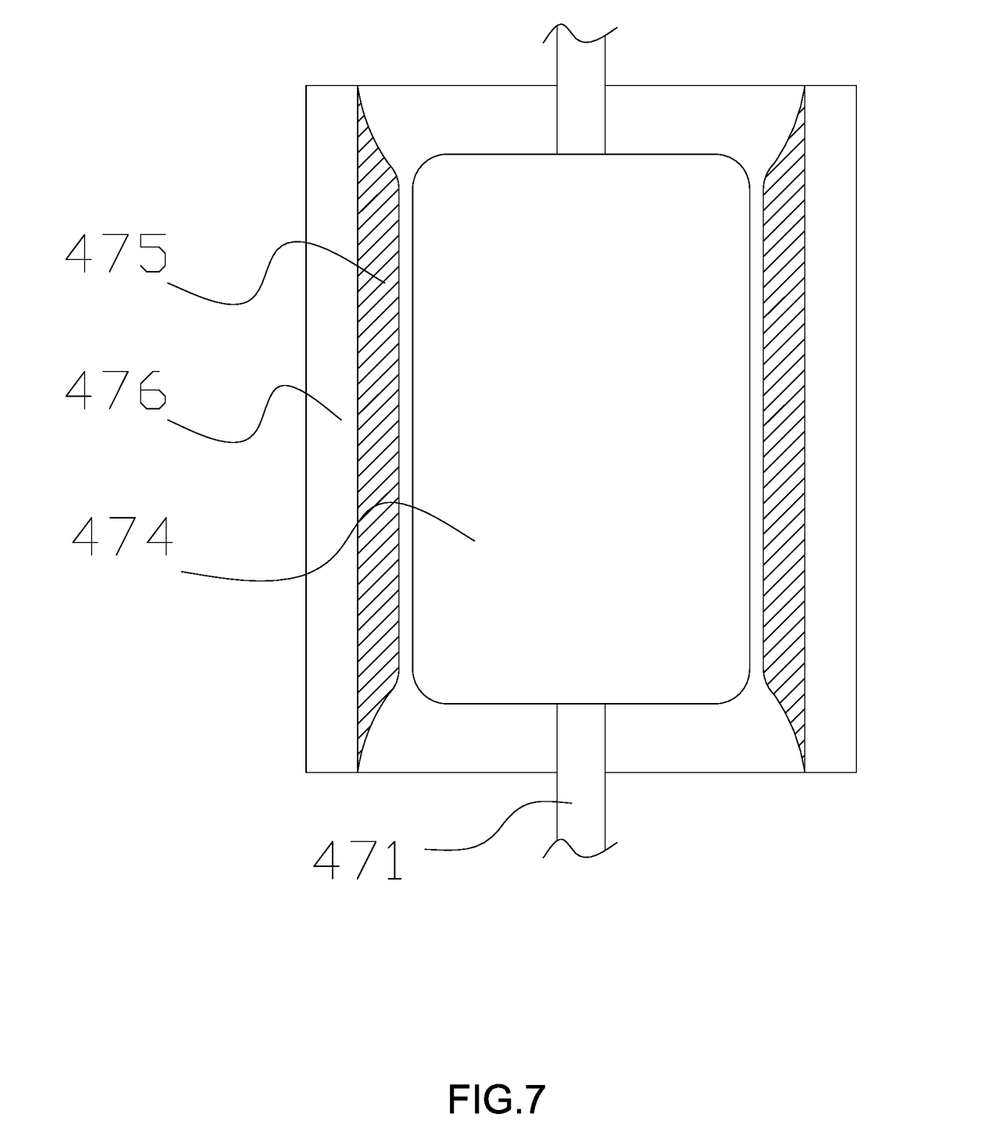
FIG. 7 is a structural view of a grinding block and a grinding ring of the invention.

Referring to FIG. 5-FIG. 7, according to the according to the supercritical in-mold foam forming device with a pretreatment function and the foaming method thereof provided by the invention, the axial stirring module 47 comprises a driven shaft 471 inserted and fixed in an inner side of the retainer ring 462, the top of the driven shaft 471 is inserted and fixed in the center of a sun gear of a planetary gear set 472, the planetary gear set 472 is specifically composed of the sun gear, a planetary gear and a gear ring, the planetary gear of the planetary gear set 472 is inserted and fixed in a shaft of the gearbox of the driving member 3, a gear ring plate of the planetary gear set 472 is fixed to an inner wall of the hollow ring 464, power is supplied to the driven shaft 471 and the hollow ring 464 by means of the planetary gear set 472, axial blades 473 are inserted and fixed in upper and lower sides of an outer shaft of the driven shaft 471, a grinding block 474 used for grinding is mounted on an outer side of a middle section of the driven shaft 471, a grinding ring 475 is disposed on an outer side of the grinding block 474, foam particles can be ground by means of the grinding block 474 and the grinding ring 475, the grinding ring 475 is mounted on an inner wall of a lantern ring 476 through bolts, an outer side of the lantern ring 476 is fixedly mounted on an inner circular surface of the spraying plate 4661 through a heat-insulation cross rod 477, opposite upper and lower sides of the grinding block 474 and the grinding ring 475 are arc-shaped to reduce the flowing resistance of a foam material, and the distance between the grinding block 474 and the grinding ring 475 is 1 cm.

The working principle of the supercritical in-mold foam forming device with a pretreatment function and the foaming method thereof is as follows:

Step 1: when used, the device is placed in a working area and is then connected to an external power supply, such that power is supplied to the device for work;

Step 2: an external pipe is connected to the one-way metering valve 42 by a worker, and an inert gas is guided into the heating box 41 to be heated, wherein the inert gas is specifically carbon dioxide commonly used during a foaming process; then, the heated inert gas is guided into the radial gas cutting module 46 through the temperature control valve 45;

Step 3: the gas flow is transported to the hollow ring 464 by means of the diverter valve 461 through the rigid tubes 463, such that the gas flow passes through the hollow ring 464 and then enters the ceramic plate 465; at this moment, the pressure in the ceramic plate 465 is increased to push the sealing plug 4666 to squeeze the elastic element 4665, such that the sealing plug 4666 horizontally moves in the through groove 4662;

Step 4: when the sealing plug 4666 moves to make a strip-shaped groove in an outer side of the sealing plug 4666 gradually separated from a strip-shaped protrusion of the through groove 4662, the gas flow enters the conical assembly 4663 through a gap and is guided into the high-pressure reactor 1 through the polymer heat-resistant membrane 4664 to sweep and preheat the interior of the high-pressure reactor 1;

Step 5: then, the inert gas flows back into the heating box 41 through a pipe at the top of the high-pressure reactor 1, and the safety valve 2 is opened to add a foam material and a foaming agent into the high-pressure reactor 1;

Step 6: then, the driving member 3 is controlled through the control panel 6 to drive the planetary gear set 472 to drive the driven shaft 471 and the hollow ring 464 to rotate in opposite directions, at this moment, the driven shaft 471 synchronously drives the axial blades 473 and the grinding block 474 to rotate, and the axial blades 473 drive the foam material and the foaming agent to flow axially in a direction parallel to the driven shaft 471, such that the foam material and the foaming agent flow from bottom to top to enter the hollow ring 464, and the grinding block 474 and the grinding ring 475 rotate in opposite directions to grind the foam material (the problems that, in the prior art, the grinding ring 475 is fixedly arranged and only the grinding block 474 can rotate, so the grinding speed is low and the grinding effect is unsatisfactory are solved); then, the inert gas is guided into the radial gas cutting module 46 and is sprayed out through the through hole in the inner side of the through groove 4662;

Step 7: the foaming agent is prevented from flowing into the through groove 4662 under the action of the polymer heat-resistant membrane 4664 and the gas pressure, such that the foam material and the foaming agent are sheared and stirred in a radial direction by the radial gas cutting module 46, and are stirred and ground in an axial direction by the axial blades 473 and the grinding block 474, such that the foaming agent infiltrates into the foam material more quickly;

Step 8: after the foaming agent infiltrates into the foam material, the two groups of uniform heating plates 442 are controlled by means of the programmable control box 43 to be powered on synchronously to generate heat, and at this moment, power output to the two groups of uniform heating plates 442 is controlled to be different, wherein the input power of the uniform heating plate 442 at the top is maximum, and the input power of the uniform heating plates 442 below is decreased in proportion; the difference in output heat of the uniform heating plates 442 leads to a temperature gradient in the graphite backing plate 444, the heat is reflected around the high-sensitivity temperature gauge 445 in equal proportion through filler materials in the intermediate mold body 443, and the proportion of the input power of the uniform heating plates 442 is calculated by adjusting a heat value gradient detected by the high-sensitivity temperature gauge 445 according to a preset value in the programmable control box 43;

Step 9: a foamed preform is discharged out of the foaming mold 5 through a discharge unit which is a common device used during the foaming process such as an extruder, then the foamed preform enters the graphite backing plate 444, the 3D foaming ratio of the 3D preform is nonsynchronous under the influence of the temperature gradient, with the foaming ratio along the length and width in the horizontal direction being small and the foaming ratio in the vertical direction being large, and then compression molding is performed, wherein to guarantee the nonsynchronous 3D foaming ratio, the thickness of an internal space of the graphite backing plate 444 is kept at a value which ensures that the heat output efficiency of the uniform heating plates 442, the heat conductivity of the graphite backing plate 444 and the foam material, and the thickness of the internal space of the graphite backing plate are in direct proportion.

According to the supercritical in-mold foam forming device with a pretreatment function and the foaming method thereof provided by the invention through improvement. the pretreatment module 4 is disposed at the front end of the high-pressure reactor 1, an inert gas is guided, through the one-way metering valve 42, into the heating box 41 to be heated, then the heated inert gas is guided into the radial cutting module 46 through the temperature control valve 45, the axial stirring module 47 is driven by the driving member 3, and the foam material and the foaming agent are sheared and stirred in radial direction by the radial gas cutting module 46 and are stirred and ground in the axial direction by the axial stirring module 47, such that the foaming agent can infiltrate into the foam material more quickly; the intra-mold temperature control module 44 is disposed in the foaming mold 5, the two groups of uniform heating plates 442 are controlled to be powered on synchronously to generate heat, a temperature gradient is formed in the graphite backing plate 444 by controlling the difference in proportion of output power, heat is reflected around the high-sensitivity temperature gauge 445 in equal proportion through the filler materials in the intermediate mold body 443, the foamed preform is conveyed into the graphite backing plate 444, the 3D foaming ratio of the 3D preform is nonsynchronous under the influence of the temperature gradient, with the foaming ratio along the length and width in the horizontal direction being small and the foaming ratio in the vertical direction being large, and then compression molding is performed; the radial gas cutting module 46 is disposed in the high-pressure reactor 1, the gas flow from the temperature control valve 45 enters the ceramic plate 465 through the rigid tubes 463 and the hollow ring 464 by means of the diverter valve 461, and at this moment, the gas pressure in the ceramic plate 465 is increased to push the sealing plug 4666 to squeeze the elastic element 4665, such that the sealing plug 4666 horizontally moves in the through groove 4662; at this moment, the gas flow enters the conical assembly 4663 through the gap and is guided into the high-pressure reactor 1 through the polymer heat-resistant membrane 4664, the sealing plug 4666 is pushed by the gas pressure to move, the through groove 4662 is communicated with the interior of the ceramic plate 465 through the strip-shaped groove formed in the outer side of the sealing plug 4666, the space between the through groove 4662 and the interior of the ceramic plate 465 can be quickly sealed by means of the elastic potential energy of the elastic element 4665 when the gas pressure decreases, and the foaming agent is prevented from flowing into the through groove 4662 by means of the polymer heat-resistant membrane 4664 which is made of a water-proof and breathable material, so the hollow ring 464 is prevented from being blocked, the situation where the proportion of materials is out of balance due to the loss of the foaming agent is avoided, the influence on foaming infiltration is reduced, and the interior of the high-pressure reactor 1 is better swept and preheated; the axial stirring module 47 is disposed in the high-pressure reactor 1, the driving member 3 drives the planetary gear set 472 to drive the driven shaft 471 and the hollow ring 464 to rotate in opposite directions, and at this moment, the axial blades 473 drive the foam material and the foaming agent to flow axially in a direction parallel to the driven shaft 471, such that the foam material and the foaming agent flow from bottom to top to enter the hollow ring 464; the grinding block 474 and the grinding ring 475 rotate in opposite directions to grind the foam material, and then an inert gas is guided into the radial gas cutting assembly 46 to shear and stir the foam material and the foaming agent in the radial direction.

The basic principle, main features and advantages of the invention are illustrated and described above, standard parts used in the invention can be purchased from the market, special-shaped parts can be customized according to the specification and drawings, all parts are connected specifically through mature and common methods in the prior art such as bolt riveting or welding, all machines, parts and equipment are of common models in the prior art, common connection methods in the prior art are bused for circuit connection, and details will not be given here.

With reference to the description of the embodiments disclosed above, those skilled in the art can implement or use the invention. Various modifications to these embodiments will be obvious to those skilled in the art. The general principle defined in this specification can be implemented in other embodiments without departing from the spirit or scope of the invention. Thus, the invention should not be limited to the embodiments in this specification, and should have the broadest scope in conformity with the principle and novel features disclosed in this specification.

What is claimed is:

1. A supercritical in-mold foam forming device with a pretreatment function, comprising a high-pressure reactor (1), a safety valve (2) disposed at a top of the high-pressure reactor (1) and sealing the top of the high-pressure reactor (1), a driving member (3) mounted by bolts in a middle of the top of the high-pressure reactor (1), a foaming mold (5) mounted by bolts on a support frame at a bottom of the high-pressure reactor (1), and a control panel (6) mounted by bolts in a middle of a right end of the high-pressure reactor (1);
wherein the supercritical in-mold foam forming device further comprises a pretreatment module (4) disposed at a front end of the high-pressure reactor (1);
the pretreatment module (4) comprises:
a heating box (41) for heating an inert gas to control the temperature of the inert gas and mounted by bolts at a front end of the high-pressure reactor (1);
a one-way metering valve (42) fixedly mounted at a pipe opening connected to a left end of the heating box (41);
a programmable control box (43) mounted by bolts at a top of the heating box (41), a heat-insulation cushion being disposed between the heating box (41) and the programmable control box (43); an intra-mold temperature control module (44) disposed in the foaming mold (5) and connected to the programmable control box (43) by a cable; a temperature control valve (45) mounted at a through hole in a bottom of a right end of the heating box (41) through a pipe; a radial gas cutting module (46) disposed in the high-pressure reactor (1); and an axial stirring module (47) disposed at a bottom of the driving member (3);
wherein the driving member (3) is composed of a gearbox and a motor, and the one-way metering valve (42) and the temperature control valve (45) are connected to interfaces of the programmable control box (43) by respective cables.

2. The supercritical in-mold foam forming device with a pretreatment function according to claim 1, wherein the intra-mold temperature control module (44) comprises:
matching mold bodies (441) fixedly mounted on opposite upper and lower sides of the foaming mold (5) and in seal fit with the upper and lower sides of the foaming mold (5);
uniform heating plates (442) mounted by bolts on inner sides of the matching mold bodies (441) on the upper and lower sides of the foaming mold (5);
an intermediate mold body (443), the matching mold bodies (441) being in seal fit with upper and lower sides of the intermediate mold body (443); a graphite backing plate (444) for heat conduction and disposed on an inner wall of the intermediate mold body (443); a high-sensitivity temperature gauge (445) disposed in the intermediate mold body (443); a data switching unit (446) connected to and mounted at a bottom of the high-sensitivity temperature gauge (445) by a cable; and a horizontal connecting plate (447) inserted and fixed in a front side of the intermediate mold body (443).

3. The supercritical in-mold foam forming device with a pretreatment function according to claim 2, wherein a heat-conducting material layer is filled and fixed in the inner wall of the intermediate mold body (443), and the high-sensitivity temperature gauge (445) is fixed in an internal space of the heat-conducting material layer.

4. The supercritical in-mold foam forming device with a pretreatment function according to claim 1, wherein the radial gas cutting module (46) comprises:
a diverter valve (461), a right end of the temperature control valve (45) being connected to a gas port in a bottom of the diverter valve (461) through a pipe;
a retainer ring (462) rotatably disposed at a top of the diverter valve (461);
rigid tubes (463) for flow guiding and inserted and fixed in through holes in an outer circular side of the diverter valve (461); a hollow ring (464), the rigid tubes (463) being connected to through holes in an inner circular wall of the hollow ring (464) through pipes; a ceramic plate (465), the hollow ring (464) being connected to upper and lower sides of the ceramic plate (465) by bolts respectively; a sprayer (466) disposed on an inner circular wall of the ceramic plate (465); and heat-resistant ring tubes (467), through holes in the upper and lower sides of the ceramic plate (465) being connected to a gas outlet of the hollow ring (464) through heat-resistant ring tubes (467) respectively.

5. The supercritical in-mold foam forming device with a pretreatment function according to claim 4, wherein a central point of the retainer ring (462) and a center of the hollow ring (464) are located at a same height, six groups of said rigid tubes (463) are disposed on the outer side of the diverter valve (461), and outer sides of the rigid tubes (463) are coated with heat-insulation coatings.

6. The supercritical in-mold foam forming device with a pretreatment function according to claim 4, wherein the sprayer (466) comprises:
a spraying plate (4661) mounted by bolts on an inner wall of the ceramic plate (465);
a through groove (4662) formed in the spraying plate (4661);

a conical assembly (4663) fixedly mounted in the through groove (4662); a polymer heat-resistant membrane (4664) filled in a space between the conical assembly (4663) and the through groove (4662); an elastic element (4665) disposed on a conical head of the conical assembly (4663); and a sealing plug (4666), an outer end of the elastic element (4665) being elastically connected to the sealing plug (4666).

7. The supercritical in-mold foam forming device with a pretreatment function according to claim 6, wherein a gas hole is formed in a position, communicated with the through groove (4662), of the conical assembly (4663), the through groove (4662) and the conical assembly (4663) are identical in shape and are distributed in a proportion of 1:1.2, strip-shaped gas holes and strip-shaped lugs matched with the strip-shaped gas holes are disposed on the sealing plug (4666) and a through hole in a rear end of the through groove (4662), and the polymer heat-resistant membrane (4664) is a water-proof and breathable membrane.

8. The supercritical in-mold foam forming device with a pretreatment function according to claim 6, wherein the axial stirring module (47) comprises:
a driven shaft (471) inserted and fixed in an inner side of the retainer ring (462);
a planetary gear set (472), a top of the driven shaft (471) being inserted and fixed in a center of a sun gear of the planetary gear set (472), the planetary gear set (472) being composed of the sun gear, a planetary gear and a gear ring, the planetary gear of the planetary gear set (472) being inserted and fixed in a shaft of the gearbox of the driving member (3), and a gear ring plate of the planetary gear set (472) being fixed to an inner wall of the hollow ring (464);
axial blades (473) inserted and fixed to upper and lower sides of an outer shaft of the driven shaft (471); a grinding block (474) for grinding and mounted on an outer side of a middle section of the driven shaft (471); a grinding ring (475) disposed on an outer side of the grinding block (474); a lantern ring (476), the grinding ring (475) being mounted by bolts on an inner wall of the lantern ring (476); and a heat-insulation cross rod (477), an outer side of the lantern ring (476) being fixedly mounted on an inner circular surface of the spraying plate (4661) through the heat-insulation cross rod (477).

9. The supercritical in-mold foam forming device with a pretreatment function according to claim 8, wherein opposite upper and lower sides of the grinding block (474) and the grinding ring (475) are arc-shaped, and a distance between the grinding block (474) and the grinding ring (475) is 1 cm.

10. A foaming method of the supercritical in-mold foam forming device with a pretreatment function according to claim 9, comprising:
Step 1: first, connecting, by a worker, an external pipe to the one-way metering valve (42), and guiding an inert gas into the heating box (41) to be heated, wherein the inert gas is carbon dioxide; then, guiding the heated inert gas into the radial gas cutting module (46) through the temperature control valve (45) to sweep and preheat an interior of the high-pressure reactor (1), then enabling the inert gas to flow back into the heating box (41) through a pipe at the top of the high-pressure reactor (1), and opening the safety valve (2) to add a foam material and a foaming agent into the high-pressure reactor (1);
Step 2: controlling, by the control panel (6), the driving member (3) to drive the planetary gear set (472) to drive the driven shaft (471) and the hollow ring (464) to rotate in opposite directions while driving, by the axial blades (473), the foam material and the foaming agent to flow upward so as to enter the hollow ring (464), causing the grinding block (474) and the grinding ring (475) to rotate in opposite directions to grind the foam material, and then guiding the inert gas into the radial gas cutting module (46) so as to spray out through the through groove (4662) such that the foam material and the foaming agent are sheared and stirred in a radial direction by the radial gas cutting module (46), and are stirred and ground in an axial direction by the axial blades (473) and the grinding block (474), thereby causing the foaming agent to infiltrate into the foam material quickly;
Step 3: controlling, by means of the programmable control box (43), the uniform heating plates (442) to be powered on synchronously to generate heat while controlling power output to the uniform heating plates (442) to be different, wherein input power of the uniform heating plate (442) at the upper side of the foaming mold (5) is maximum, and input power of the uniform heating plate (442) at the lower side f the foaming mold (5) is decreased relative thereto; a difference in output heat of the uniform heating plates (442) leading to a temperature gradient in the graphite backing plate (444), the heat being reflected around the high-sensitivity temperature gauge (445) in equal proportion through filler materials in the intermediate mold body (443), and the proportion of the input power of the uniform heating plates (442) is calculated by adjusting a heat value gradient detected by the high-sensitivity temperature gauge (445) according to a preset value in the programmable control box (43), thereby forming a foamed preform in the foaming mold (5); and
Step 4: discharging the foamed preform out of the foaming mold (5) through a discharge unit and causing the foamed preform to enter the graphite backing plate (444), making a 3D foaming ratio of the preform nonsynchronous under the influence of the temperature gradient, with a foaming ratio along a length and width in a horizontal direction of the foamed preform being small and a foaming ratio in a vertical direction of the foamed preform being large, and then performing compression molding of the foamed preform.

* * * * *